US010970113B1

(12) United States Patent
Kurtzer et al.

(10) Patent No.: US 10,970,113 B1
(45) Date of Patent: Apr. 6, 2021

(54) SYSTEMS AND METHODS FOR ORCHESTRATING SEAMLESS, DISTRIBUTED, AND STATEFUL HIGH PERFORMANCE COMPUTING

(71) Applicant: CTRL IQ, Inc., Albany, CA (US)

(72) Inventors: Gregory Kurtzer, Albany, CA (US); John Frey, Sammamish, WA (US); Ian Kaneshiro, East Lansing, MI (US); Robert Adolph, Huntington Beach, CA (US); Cedric Clerget, Ormenans (FR)

(73) Assignee: CTRL IQ, Inc., Albany, CA (US)

( * ) Notice: Subject to any disclaimer, the term of this patent is extended or adjusted under 35 U.S.C. 154(b) by 0 days.

(21) Appl. No.: 17/133,256

(22) Filed: Dec. 23, 2020

(51) Int. Cl.

| | |
|---|---|
| ***G06F 9/48*** | (2006.01) |
| ***G06F 9/50*** | (2006.01) |
| ***G06F 9/46*** | (2006.01) |
| ***H04L 29/08*** | (2006.01) |
| ***G06F 11/30*** | (2006.01) |
| ***G06F 11/34*** | (2006.01) |
| ***G06F 9/54*** | (2006.01) |

(52) U.S. Cl.
CPC .............. *G06F 9/4881* (2013.01); *G06F 9/46* (2013.01); *G06F 9/50* (2013.01); *G06F 9/5005* (2013.01); *G06F 9/505* (2013.01); *G06F 9/5011* (2013.01); *G06F 9/5016* (2013.01); *G06F 9/5027* (2013.01); *G06F 9/5033* (2013.01); *G06F 9/5038* (2013.01); *G06F 9/5044* (2013.01); *G06F 9/5055* (2013.01); *G06F 9/5083* (2013.01); *G06F 9/54* (2013.01); *G06F 11/3017* (2013.01); *G06F 11/3409* (2013.01); *H04L 29/08135* (2013.01)

(58) Field of Classification Search
None
See application file for complete search history.

(56) References Cited

U.S. PATENT DOCUMENTS

| | | | | |
|---|---|---|---|---|
| 2009/0113442 A1* | 4/2009 | Deidda | G06F 9/5072 718/105 |
| 2013/0198755 A1* | 8/2013 | Kim | G06F 9/505 718/104 |
| 2014/0289733 A1* | 9/2014 | Fritz | G06F 9/5066 718/104 |
| 2016/0306673 A1* | 10/2016 | You | G06F 9/5038 |
| 2020/0026580 A1* | 1/2020 | Bahramshahry | G06F 9/4881 |

* cited by examiner

*Primary Examiner* — Qing Yuan Wu
(74) *Attorney, Agent, or Firm* — Ansari Katiraei LLP; Arman Katiraei; Sadiq Ansari

(57) ABSTRACT

An orchestration system may provide distributed and seamless stateful high performance computing for performance critical workflows and data across geographically distributed compute nodes. The system may receive a task with different jobs that operate on a particular dataset, may determine a set of policies that define execution priorities for the jobs, and may determine a current state of compute nodes that are distributed across different compute sites. The system may distribute the jobs across a selected set of the compute nodes in response to the current state of the set of compute nodes satisfying more of the execution priorities than the current state of other compute nodes. The system may produce task output based on modifications made to the particular database as each compute node of the set of compute nodes executes a different job of the plurality of jobs.

20 Claims, 8 Drawing Sheets

400
Receive definition of a task — 402
Determine the task and/or job state — 404
Obtain policies for the jobs and/or task — 406
Determine the current state of the compute nodes — 408
Generate predictive models for a next job in the task definition based on the task state, policies, and/or compute node state — 410
Select one or more compute nodes predicted in the predictive models to best optimize and/or prioritize execution of the next job according to the obtained policies — 412
Execute the next job using the hardware resources of the selected one or more compute nodes — 414

SYSTEMS AND METHODS FOR ORCHESTRATING SEAMLESS, DISTRIBUTED, AND STATEFUL HIGH PERFORMANCE COMPUTING

BACKGROUND

High performance computing ("HPC") may include using specialized supercomputing systems to perform stateful, continuous, and/or other processor-intensive tasks, and/or processing of large datasets. Data analytics, artificial intelligence, machine learning, simulations, and/or modeling are some examples of HPC tasks.

The transition of HPC away from on-premises deployments and into the "cloud" has stagnated because of the costs associated with accessing and/or moving the large datasets across data networks, security associated with moving the datasets across data networks, security associated with performing confidential tasks on shared hardware, the performance impact for remote nodes executing the same task, exchanging data with one another over a data network, accessing the large datasets from other remote locations from the large datasets, and/or other concerns from using shared, virtualized, and/or distributed compute resources.

DETAILED DESCRIPTION OF PREFERRED EMBODIMENTS

Figure 1:
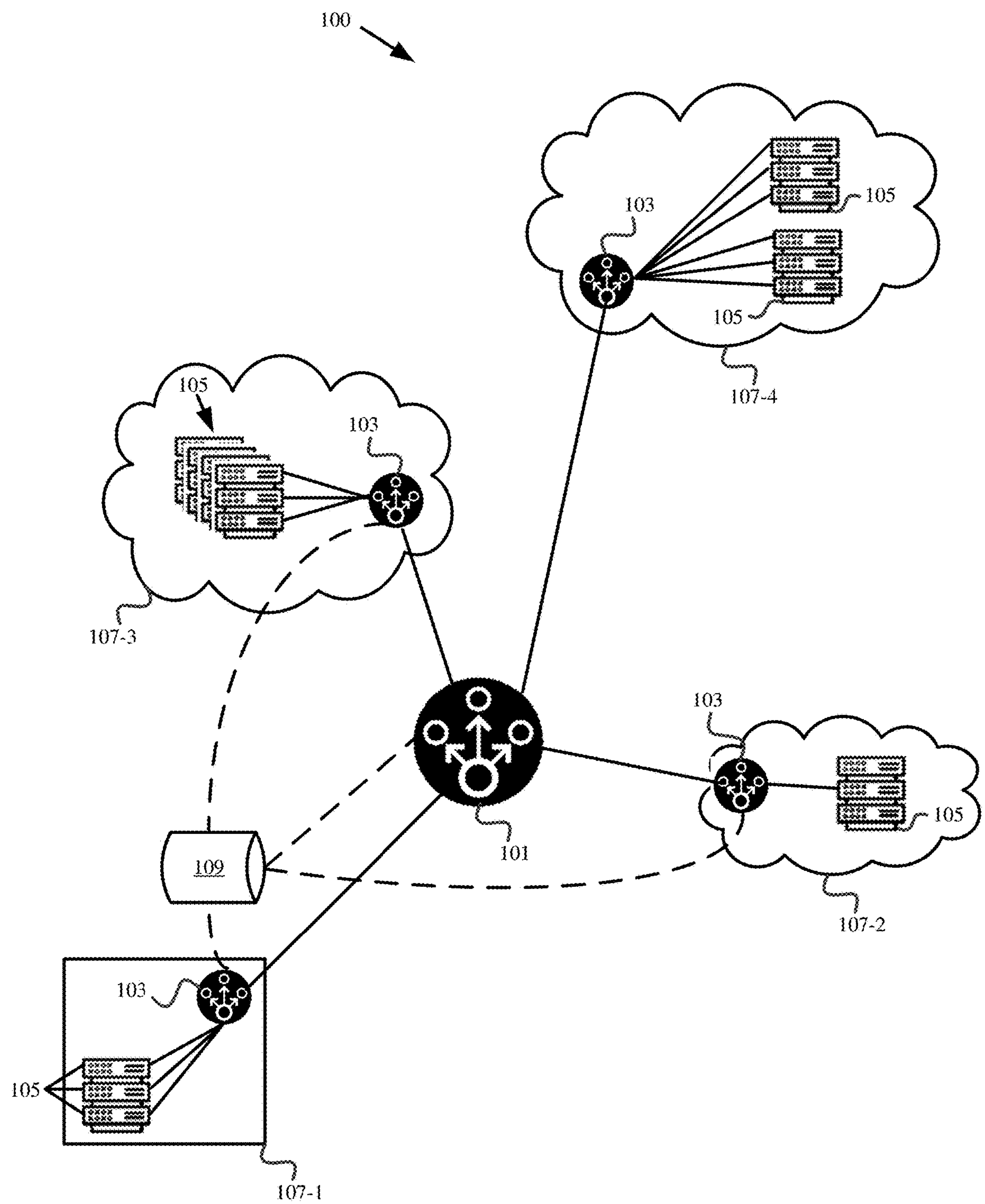
FIG. 1 illustrates an example architecture of the distributed high performance computing ("HPC") orchestration system in accordance with some embodiments presented herein.

The following detailed description refers to the accompanying drawings. The same reference numbers in different drawings may identify the same or similar elements.

Disclosed are systems and methods for providing seamless, distributed, and stateful high performance computing ("HPC") for performance critical workflows and data across geographically distributed compute nodes. Providing the distributed stateful HPC may include automatically orchestrating the execution of different jobs that are part of the same task on different sets of compute nodes so as to complete each job and/or the overall task in satisfaction of a set of policies. Providing the distributed stateful HPC may further include dynamically establishing interoperability between the different sets of computes nodes so that the single task may be adapted to seamlessly execute at different compute sites and/or on different hardware resources that may be optimized for the different jobs without user specification of the different sets of computes nodes, different compute sites, and/or different hardware resources.

In some embodiments, a distributed HPC orchestration system may perform the automatic orchestration in response to a user-provided task definition. The task definition may identify the jobs associated with a task, the data for each job, and/or the set of policies that specify execution priorities for the task/job execution.

The distributed HPC orchestration system may perform the automatic orchestration by dynamically selecting a next set of compute nodes that satisfy more of the execution priorities from the set of policies than other compute nodes as determined from a modeling of the state (e.g., available resources, performance, cost, etc.) of the plurality of distributed compute nodes, the location of the compute nodes, and an initial state or last state of the task as created by a previously selected set of compute nodes that completed a last job of the task. The task state may track the storage location of data output from the last job, the storage location of data for the next job, and/or state of the previously selected set of compute nodes. Performing the automatic orchestration may further include deploying, configuring, and/or instantiating execution of the next job on resources of the selected next set of compute nodes without user intervention or user interaction.

Accordingly, the distributed HPC orchestration system may free users from determining how to maximize performance, minimize cost, and/or satisfy other policies for tasks that may involve large datasets distributed across different storage sites, different jobs that execute faster on different hardware, and/or different users accessing the results of those jobs from different locations. The distributed HPC orchestration system may also free users from having to deploy and/or manage different sets of compute nodes that may be used to execute different jobs of a task. Instead, the distributed HPC orchestration system may automatically determine and switch job execution to one or more compute nodes in one or more locations that maximize performance, minimize cost, and/or satisfy other policies defined by a user.

For instance, the distributed HPC orchestration system may instantiate and/or execute a particular job for a first task using on-premises compute nodes when the data for the particular job of the first task is stored at one or more on-premises storage devices and relocating the data would result in performance that does not satisfy one or more defined policies. The distributed HPC orchestration system may instantiate and/or execute the same particular job for a different second job using cloud compute nodes of a particular cloud service provider when the data for the particular job of the second task is stored in a storage cluster of the cloud service provider and the costs for relocating the data would violate one or more defined policies. Alternatively, the distributed HPC orchestration system may instantiate and/or execute the same particular job for the second job using the cloud compute nodes when the performance penalty for relocating the job data from a storage location to the cloud compute nodes is less than the performance penalty for using resources of other compute nodes to perform the second job.

FIG. 1 illustrates example architecture 100 of the distributed HPC orchestration system in accordance with some embodiments presented herein. As shown in FIG. 1, the distributed HPC orchestration system may include primary orchestrator 101, various orchestrator agents 103 that operate with different compute nodes 105 at different compute sites 107-1, 107-2, 107-3, and 107-4 (herein sometimes collectively referred to as "compute sites 107" or individually as "compute site 107"), and one or more repositories 109.

Each compute site 107 may correspond to an on-premise compute cluster or a remote compute cluster. An on-premise compute site 107 may include one or more compute nodes 105 on a local area network ("LAN") or private network, may be managed by a user or an entity associated with the user, and/or may not be accessible to other users. A remote compute site 107 may be located at different geographic and/or network locations, may be operated by the same or different cloud service providers, content delivery networks ("CDNs"), and/or other distributed platforms, and/or may be made available to different resources in an on-demand basis. Each compute site 107 may be accessed via data network.

In some embodiments, one or more compute sites 107 may include or integrate with one or more storage devices. For instance, a particular compute site 107 may correspond to an Amazon Web Services ("AWS") compute cluster that is collocated with or geographically proximate to an AWS Simple Cloud Storage ("S3") cluster.

Compute nodes 105 in the same or different compute sites 107 may include different hardware resources and/or different amounts of the hardware resources that may be allocated, shared, and/or otherwise used to perform different jobs, HPC tasks, and/or other compute and/or processing operations. The hardware resources may include one or more processors, memory, network bandwidth, storage, and/or other hardware that may be partitioned, shared, and/or used to perform different jobs at different times for different users.

The different processors may include different speeds, architectures (e.g., x86, advanced RISC machine ("ARM"), PowerPC, etc.), numbers of cores, cache sizes, specializations (e.g., graphical processing units ("GPUs"), central processing units ("CPUs"), crypto processors, neural network processors, etc.), and other processor variations. Accordingly, compute nodes 105 in the same or different compute sites 107 may provide specialized hardware that is optimized for different jobs. For instance, a first set of compute nodes 105 may include high performance x86 processors, and a second set of compute nodes 105 may include power efficient ARM processors. Similarly, a first set of compute nodes 105 at a first compute site 107 may include GPUs for graphic manipulation and/or image rendering, and a second set of compute nodes 105 at a second compute site 107 may include crypto processors for efficient data encryption and/or decryption.

In some embodiments, a compute node 105 may correspond to a rack or set of devices that provide a collective set of resources, and/or that may be virtualized to represent a single set of resources. In some other embodiments, a compute node 105 may directly correspond to a single device with separately allocatable resources. Each compute node 105 may be accessed via an Internet Protocol ("IP") address, other network address, and/or other identifier (e.g., hostname, Uniform Resource Locator ("URL"), etc.).

In addition to one or more compute nodes 105 and/or storage devices, each compute site 107 may include one or more orchestrator agents 103. In some embodiments, each orchestrator agent 103 may run on and/or directly control the hardware resources of a single compute node 105 (e.g., a single compute device or a set of compute devices that are virtually represented as a single compute node 105). In some embodiments, each orchestrator agent 103 may be a standalone device that runs separate from compute nodes 105 in a particular compute site 107, but that controls the hardware resources of all compute nodes 105 in that particular compute site 107. In some embodiments, orchestrator agents 103 may be hierarchically organized in a compute site 107 with a child orchestrator agent 103 running on and/or directly controlling each compute node 105, and a parent orchestrator agent 103 managing each child orchestrator agent 103 in a compute site 107.

Each orchestrator agent 103 may map, track, and/or allocate resources of one or more compute nodes 105, may manage the deployment, configuration, and/or execution of different executable jobs on shared and/or partitioned resources of the one or more compute nodes 105, and may provide the executable jobs access to relevant data at different remote nodes. In some embodiments, each executable job may include instructions, scripts, commands, and/or code in one or more programming languages. Each executable job may be included as part of a container, executable environment, and/or image that may run directly on the operating system and/or kernel of one or more compute nodes 105. In particular, orchestrator agent 103 may allocate a subset of resources from one or more compute nodes 105 to perform the operations specified for a job, may deploy the container, executable environment, or image with the job to the allocated subset of resources, may configure the job and/or subset of resources, may provide one or more identifiers for job data that may be stored in one or more remote volumes, and may initiate execution of the job using the subset of resources and the remotely accessible job data.

Orchestrator agents 103 may be communicably coupled with one another and/or primary orchestrator 101 in order to form and/or implement the distributed HPC orchestration system. Primary orchestrator 101 may include one or more management devices of the distributed HPC orchestration system that provide command and control over orchestrator agents 103. In particular, primary orchestrator 101 may provide seamless distributed task execution by directing operation of the orchestration agents 103 and/or the usage of compute node 105 resources.

Primary orchestrator 101 may aggregate compute node 105 hardware resource availability from orchestrator agents 103. Orchestrator agents 103 may also provide benchmarking information that quantifies the performance of different resources for executing different jobs. Orchestrator agents 103 may generate the performance benchmarks from tracking execution of prior jobs on the same resources.

Primary orchestrator 101 may receive user-defined policies and/or task definitions for different HPC and/or other compute tasks from different users. Each task definition may specify a sequence of one or more compute jobs for stateful or stateless processing of data that may be stored at one or more storage locations, and/or for producing output based on the collective result of the compute jobs. A task definition may include dependencies between different jobs of the task in which the output of one job provides the input for another job. The output may include complex data analytics, continuous artificial intelligence and/or machine learning development for different use cases, simulations, and/or predictive modeling.

Primary orchestrator 101 may determine an optimal set of compute nodes 105 for executing each job that is specified within each task definition file based on the user-defined policies, current state of compute nodes 105, current state of the data for each job, and/or state of a last executed job from the same task definition. In some embodiments, primary orchestrator 101 may select a first set of compute nodes 105 as the optimal set of compute nodes 105 when the current state of the first set of compute nodes (e.g., available hardware resources, location of the compute nodes, cost of using the hardware resources, etc.) satisfies more of the execution priorities from the set of policies than the current state of other compute nodes 105. Primary orchestrator 101 may then direct the one or more orchestrator agents 103 associated with the optimal set of compute nodes 105 in allocating resources of the optimal set of compute nodes 105 for execution of the task definition jobs.

By prioritizing the selection of compute nodes 105 based on the user-defined policies and state information, primary orchestrator 101 does not perform a simplistic allocation of jobs to any available compute node 105. Instead, primary orchestrator 101 may dynamically and selectively execute each job using compute nodes 105 that provide greatest conformance to the policies based on the current state of compute nodes 105 and the task being executed, and/or that prioritize job execution according to the policies and the current state. Accordingly, the selection of compute nodes 105 for a first job in a particular task definition may be prioritized based on the location of the input data for the first job and the hardware resources that may complete the operations of the first job in the least amount of time, and the selection of compute nodes 105 for a second job in the particular task definition may be affected by the selection of compute nodes 105 for the first job. For instance, the selection of compute nodes 105 for the first job may set a location where input data and/or other dependencies for the second job may be found, and execution time for the second job may be minimized by selecting compute nodes 105 that are located in the same or a geographically proximate compute cluster 107 as the compute nodes 105 selected for the first job, and that include hardware resources that are optimized for the operations of the second job. In some embodiments, the policies may prioritize maximizing performance, minimizing cost, maximizing performance per unit of cost, and/or accounting other factors in the completion of each job.

One or more repositories 109 may include database, datastores, and/or other storage clusters into which users may upload the containers, executable environments, or images for the different jobs that are defined in the task definitions. Primary orchestrator 101 and/or orchestrator agents 103 may access repositories 109 in order to retrieve the containers, executable environments, or images for the jobs that are allocated to run on hardware resources of different compute nodes 105.

In some embodiments, the distributed HPC orchestration system architecture 100 illustrated in FIG. 1 may be scaled to include more or less repositories 109, compute sites 107, compute nodes 105, orchestrator agents 103, and/or primary orchestrators 101. In some embodiments, the distributed HPC orchestration system architecture 100 may provide different hierarchical organizations for compute sites 107, compute nodes 105, and/or orchestrators 101 and 103.

Figure 2:
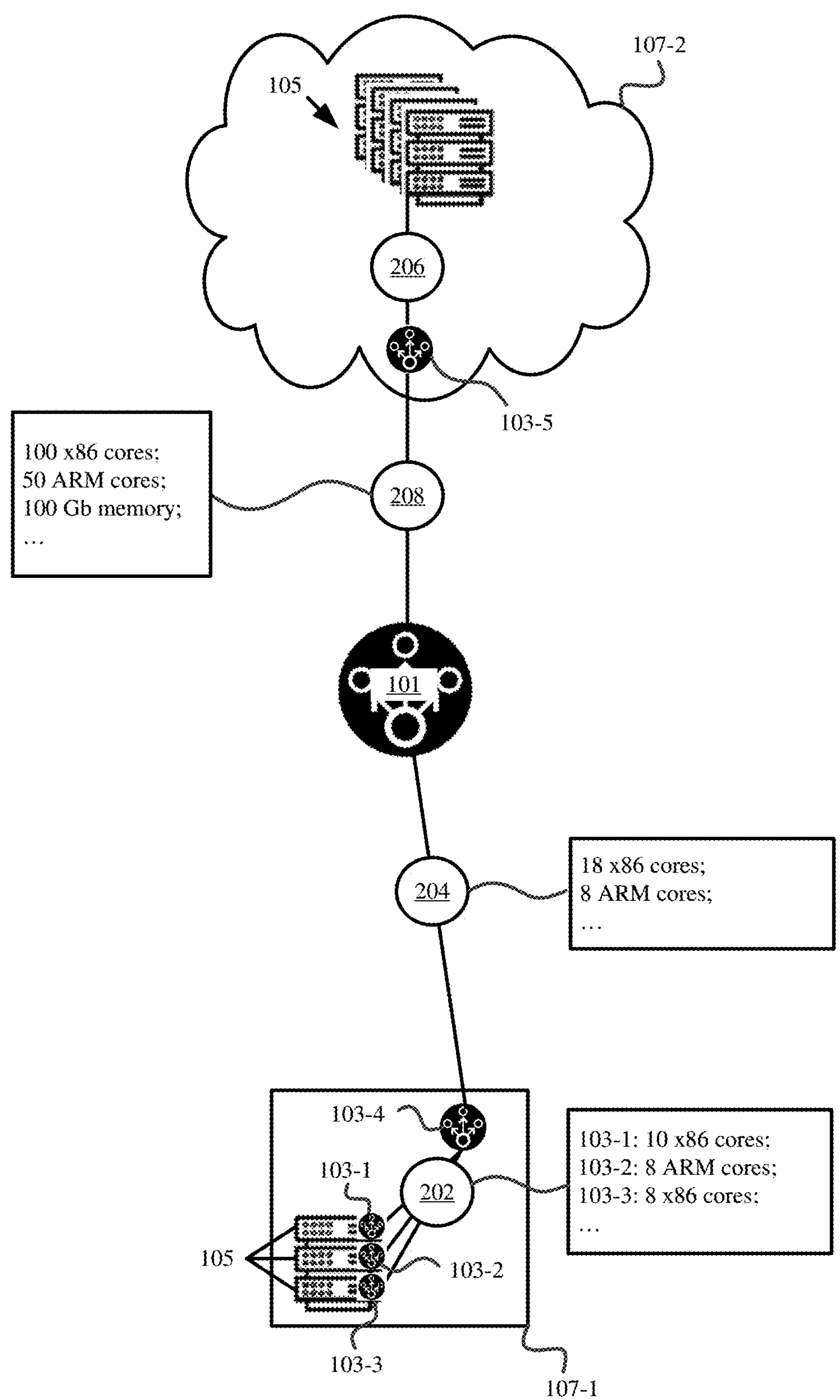
FIG. 2 illustrates an example of hierarchically mapping compute node state within the distributed HPC orchestration system in accordance with some embodiments presented herein.

FIG. 2 illustrates an example of hierarchically mapping compute node 105 state within the distributed HPC orchestration system in accordance with some embodiments presented herein. As shown in FIG. 2, primary orchestrator 101 may track the current state of the distributed HPC orchestration system based on the periodic state updates provided by and/or collected from different orchestrator agents 103.

At on-premises compute site 107-1, different child orchestrator agents 103-1, 103-2, and 103-3 may be installed and running on different compute nodes 105 of on-premises compute site 107-1. Each child orchestrator agent 103-1, 103-2, and 103-3 may perform a discovery routine to identify available resources for a different compute node 105, and may provide (at 202) a listing of the identified available resources to parent orchestrator 103-4 running in on-premises compute site 107-1. Parent orchestrator 103-4 may aggregate and/or compile the state information for compute nodes 105 in on-premises compute site 107-1, and may provide (at 204) the state information to primary orchestrator 101.

At remote compute site 107-2, compute nodes 105 and/or hardware resources may be scaled up or down in an on-demand basis. Orchestrator agent 103-5 may be installed and running on a single compute node 105 of remote compute site 107-2. Orchestrator agent 103-5 may map (at 206) the available resources of remote compute site 107-2 without directly accessing each compute node 105 of the remote compute site 107-2. For instance, orchestrator agent 103-5 may query a database of remote compute site 107-2 to determine a full listing of hardware resources that may be allocated at remote compute site 107-2, and/or to determine which of the hardware resources and/or compute nodes 105 are available. Orchestrator agent 103-5 may provide (at 208) the compute node 105 state information to primary orchestrator 101.

In any case, orchestrator agents 103 may provide (at 204 and 208) primary orchestrator 101 with the resources that are discovered for each compute node 105 or for the larger compute site monitored by an orchestrator agent 103. As noted above, the discovered resources may include different processors, memory, network, and/or other resources that may be configured for use in executing different jobs. As new jobs are run on a compute node 105 or the compute node 105 performs other operations, orchestrator agent 103 may provide primary orchestrator 101 with updated resource availability.

Figure 3:
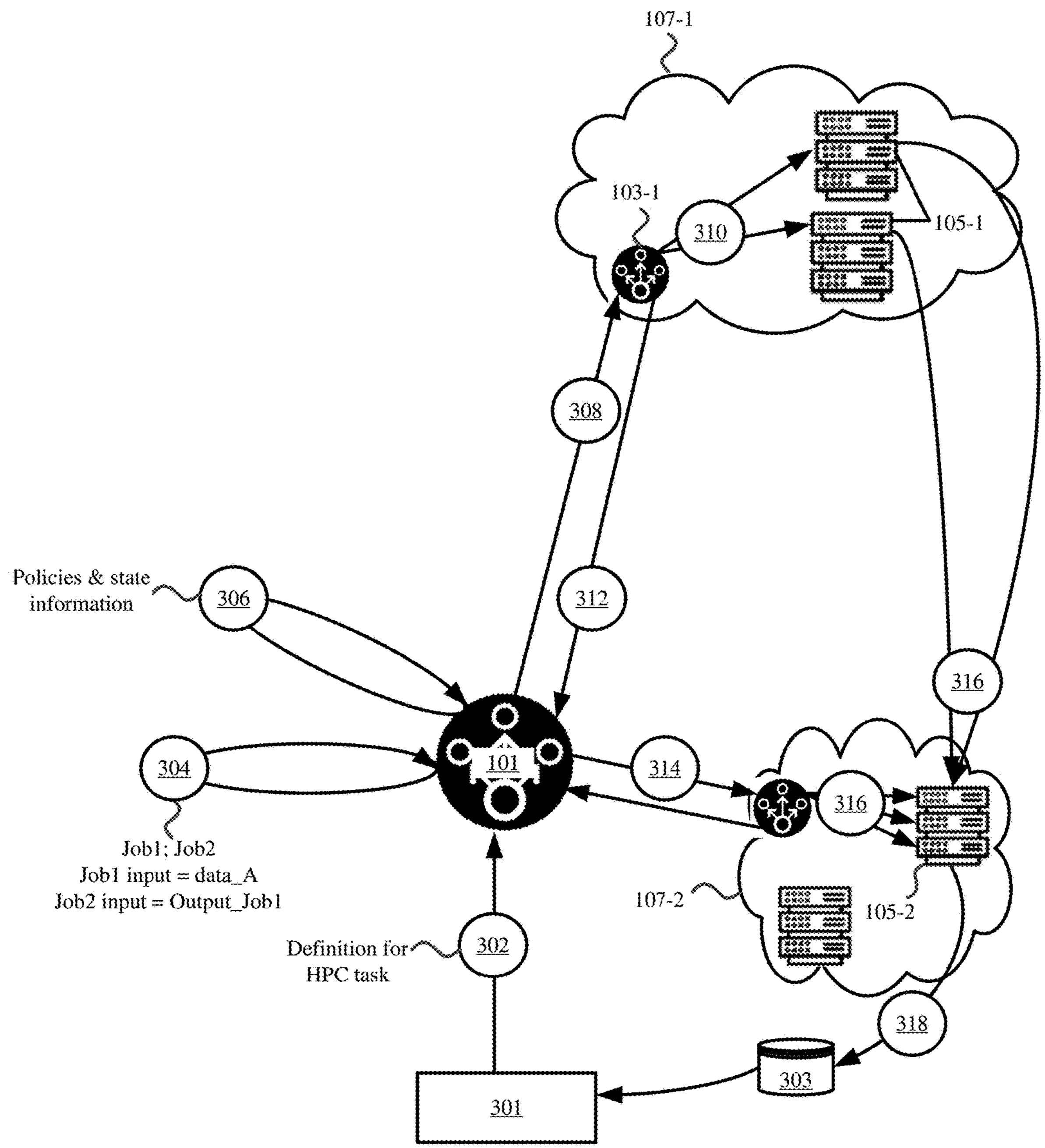
FIG. 3 illustrates an example of automatically orchestrating optimal execution of a task based on the current state of compute nodes and/or policies that are defined for the task in accordance with some embodiments presented herein.

Primary orchestrator 101 may determine the optimal set of compute nodes 105 for executing different jobs of different tasks based in part on the state of compute nodes 105 reported by orchestrator agents 103, and further based on job and/or task policies. FIG. 3 illustrates an example of automatically orchestrating optimal execution of a task based on the current state of compute nodes 105 and/or policies that are defined for the task in accordance with some embodiments presented herein.

As shown in FIG. 3, primary orchestrator 101 may receive (at 302) a task definition from user device 301. In some embodiments, user device 301 may provide (at 302) the task definition as part of a request for computing services. The request may be issued as a request of one or more network protocols or messaging formats (e.g., HyperText Transfer Protocol ("HTTP")).

Primary orchestrator 101 may parse (at 304) the task definition in order to determine the one or more jobs of the overall task, the order of job execution, and data that may be accessed during execution of each job. Parsing (at 304) the task definition may include opening the task definition file, and extracting identifiers that identify the task jobs and/or the storage location of the data accessed for each job.

Primary orchestrator 101 may obtain (at 306) a set of policies for the task definition and/or current state of the task directly or indirectly from the task definition. The set of policies may be defined by or for a particular user associated with user device 301, or may be defined for the jobs in the task definition, and/or may be included as part of the task definition. The set of policies may set performance, cost, and/or other targets for executing a particular job or all jobs of the task specified by the task definition. For instance, a first task definition may include a particular machine learning task of a first user, and the first user may have defined a first set of policies for maximizing performance of the particular machine learning task. A second workflow definition may include a particular modeling task of a second user, and primary orchestrator 101 may obtain a second set of global policies for prioritizing the execution of modeling tasks on ARM processors when no specific policies are defined by the second user.

Although not shown, primary orchestrator 101 may obtain the current state of compute nodes 105 from orchestrator agents 103. Primary orchestrator 101 may generate a mapping of available hardware resources at different compute sites 107 based on the current state of compute nodes 105.

Primary orchestrator 101 may select first set of compute nodes 105-1 at first compute site 107-1 to perform a first job in the task definition based on a first set of policies that are defined for the first job, the state of the task prior to executing the first job, and/or the current state of compute nodes 105. Primary orchestrator 101 may search through the available resources to identify different sets of compute nodes that satisfy a greatest number of the first set of policies and/or that satisfy the first set of policies with the most conformance. For instance, primary orchestrator 101 may determine that the first job is optimized for a particular processor architecture (e.g., ARM instead of x86), runs fastest with 10 processor cores, requires at least 1 gigabyte ("GB") of memory, and/or that the first job is deemed a time insensitive task in the task definition. Accordingly, primary orchestrator 101 may identify the different sets of compute nodes 105 that satisfy each such policy. Primary orchestrator 101 may then select first set of compute nodes 105-1 from the different sets of compute nodes based on the task state, wherein the task state may involve the amount of data processed during execution of the first job and/or the location of data.

In some embodiments, primary orchestrator 101 may generate predictive models that simulate performance, cost, and/or characteristics of executing the first job on different sets of compute nodes 105. The predictive models may estimate time to configure different compute nodes 105 with the first job, time to complete the first job based on prior benchmarking of the first job or similar jobs running on different sets of hardware resources, time to access the first job data by compute nodes 105 at different network locations, and/or time to output data to a storage location specified in the task definition. The predictive models may also estimate cost to complete the first job based on the cost to reserve resources of different compute nodes 105 and/or cost to move data to and from the first job at different compute nodes 105.

For instance, primary orchestrator 101 may determine that the first job data is stored in a storage cluster of a first cloud service provider, that the first job data exceeds 1 GB in total size, and that transferring that much data away from the first cloud service provider to compute nodes 105 of another cloud service provider or an on-premises compute site would incur performance and cost penalties that violate one or more of the first job policies. Accordingly, primary orchestrator 101 may select first set of compute nodes 105-1 to include resources in compute site 107-1 of the first cloud service provider that are closest to the storage cluster where the first job data is stored, and that offer the resources that are optimized for executing the first job or that have been benchmarked to provide fastest or lowest cost execution of the first job.

Primary orchestrator 101 may determine that first orchestrator agent 103-1 controls the allocation of first set of compute nodes 105-1. Accordingly, primary orchestrator 101 may direct (at 308) first orchestrator agent 103-1 in deploying and/or running the first job on a desired set of resources from first set of compute nodes 105-1. Directing (at 308) first orchestrator agent 103-1 may include primary orchestrator 101 providing first orchestrator agent 103-1 with URLs and/or network addressing for retrieving the first job data and the first job containers (e.g., first job executable environments or images).

First orchestrator agent 103-1 may instantiate (at 310) execution of the first job on hardware resources of first set of compute nodes 105-1 by allocating the desired amount of resources from first set of compute nodes 105-1, deploying the first job containers to the allocated resources, and/or configuring the first job to access the first job data using the provided URLs and/or network addressing. First orchestrator agent 103-1 may monitor execution of the first job by first set of compute nodes 105-1, and may notify (at 312) primary orchestrator 101 upon completion of the first job.

Prior to or in response to receiving (at 312) the first job completion notification, primary orchestrator 101 may select second set of compute nodes 105-2 at second compute site 107-2 to perform a second job in the task definition. The task definition may define the second job to be dependent on output of the first job by requiring the output of the first job as input for the second job.

Primary orchestrator 101 may generate predictive models for the performance, cost, and/or other characteristics of executing the second job on different sets of compute nodes 105. Primary orchestrator 101 may compare the predictive models against a second set of policies defined for the second job execution. Based on the comparison, primary orchestrator 101 may identify and/or determine that execution of the second job on hardware resources of second set of compute nodes 105-2 best satisfies or conforms to the priorities set within the second set of policies. For instance, primary orchestrator 101 may determine that the second job generates graphical visualizations based on output from the first job, that second set of compute nodes 105-2 include specialized GPUs for generating the graphical visualizations in less time and with less cost than resources of other compute nodes 105, and that the output from the first job is less than 100 megabytes ("MBs") in size. Primary orchestrator 101 may further determine, based on the predictive models, that a performance policy for the second job is best satisfied by transferring the first job output from the first cloud service provider to second set of nodes 105-2 and using the specialized hardware resources of second set of compute nodes 105-2, rather than hardware resources of first set of nodes 105-1 or other available compute nodes 105, to perform the second job.

Primary orchestrator 101 may determine that second orchestrator agent 103-2 controls the allocation of second set of compute nodes 105. Accordingly, primary orchestrator 101 may direct (at 314) second orchestrator agent 103-2 in configuring (at 316) the specialized hardware resources of second set of compute nodes 105-2 with the second job container and with the network addressing for retrieving the first job output from first set of compute nodes 105-1. Primary orchestrator 101 may provide second orchestrator agent 103-2 with the one or more containers for running the second job on second set of compute nodes 105-2, or the identifiers for the second job in the task definition with which second orchestrator agent 103-2 may retrieve the one or more containers. As shown in FIG. 3, second set of compute nodes 105-2 may retrieve (at 316) the first job output from first set of compute nodes 105-1, may process the data according to the second job, and may provide (at 318) the second job output to requesting user device 301 and/or to storage cluster 303 where the second job output may be subsequently access by user device 301 or other user devices.

Accordingly, the distributed HPC orchestration system may dynamically execute different jobs of the same task using different compute nodes 105 in different compute sites 107 in order to prioritize and/or optimize the execution of the different jobs while maintaining interoperability between the different compute nodes 105. Specifically, the distributed HPC orchestration system may provide distributed task execution in order to dynamically adapt execution of different task jobs to the current state of compute nodes 105 (e.g., resource availability), the current state of the task (e.g., where is the data located, cost and/or performance for moving the data, etc.), and/or policies for specifying the prioritization targets to satisfy in completing each job and/or the overall task. In particular, the distributed task execution provides seamless execution of a task using different compute nodes 105 at different compute sites and/or on different hardware resources that may be optimized for the different jobs without user specification of the different sets of computes nodes, different compute sites, and/or different hardware resources Similarly, the distributed HPC orchestration system may dynamically execute the same job for different tasks or different instances of the same task using different compute nodes 105 in different compute sites 107 in order to prioritize and/or optimize the execution of that same job as the task policies change, the current state of compute nodes 105 changes, and/or task state changes (e.g., input data for the same job of different tasks is located in different regions, is in different quantities, has different performance, cost, and/or other penalties associated with remote access, etc.).

Figure 4:
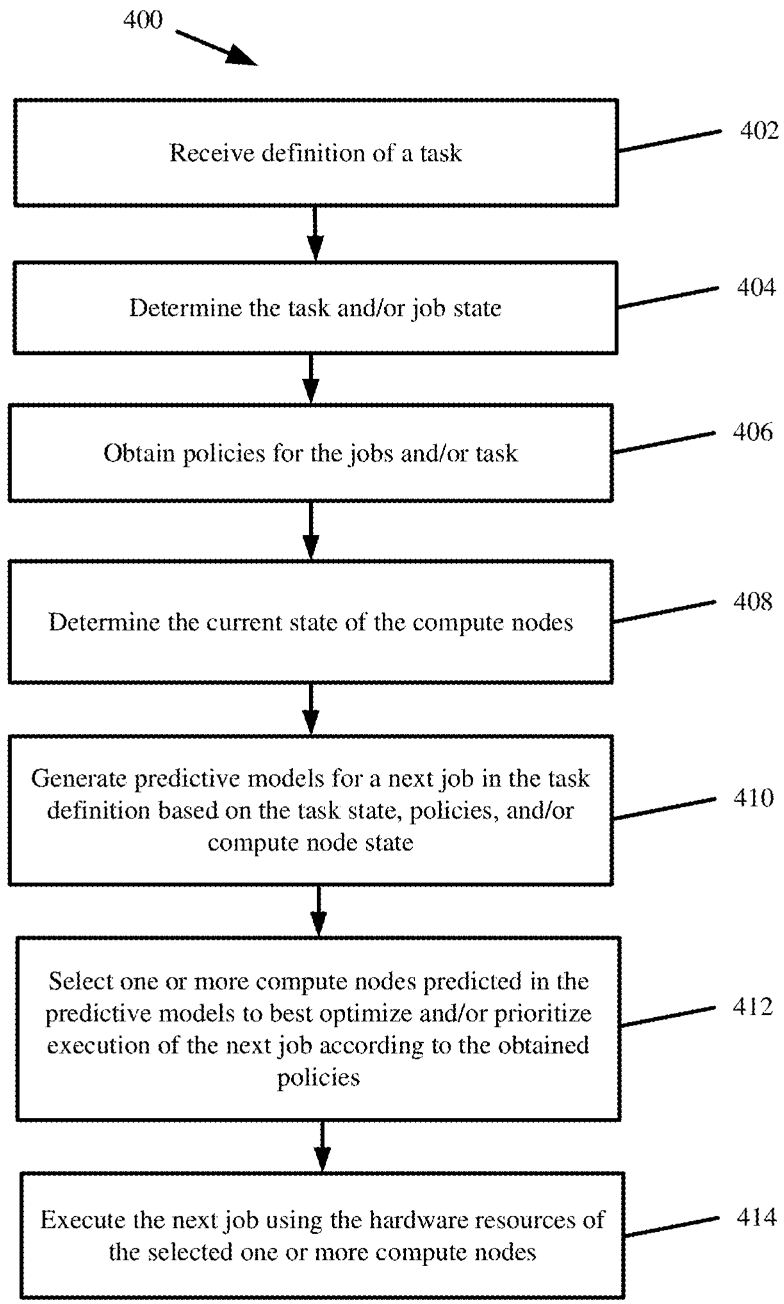
FIG. 4 presents a process for dynamically executing jobs of a task using different compute nodes based on different policy considerations and changing state information in accordance with some embodiments presented herein.

FIG. 4 presents a process 400 for dynamically executing jobs of a task using different compute nodes 105 based on different policy considerations and changing state information in accordance with some embodiments presented herein. Process 400 may be implemented by the distributed HPC orchestration system using one or more of primary orchestrator 101 and orchestrator agents 103.

Process 400 may include receiving (at 402) a task definition as part of a request for optimized distributed execution of a HPC or other compute task. The task definition may be a file that specifies a sequencing and/or dependencies for different jobs of the task, identifiers for locating the containers with the executable environments or images for each job, and/or identifiers for accessing the data that is input and/or processed as part of each job.

Figure 5:
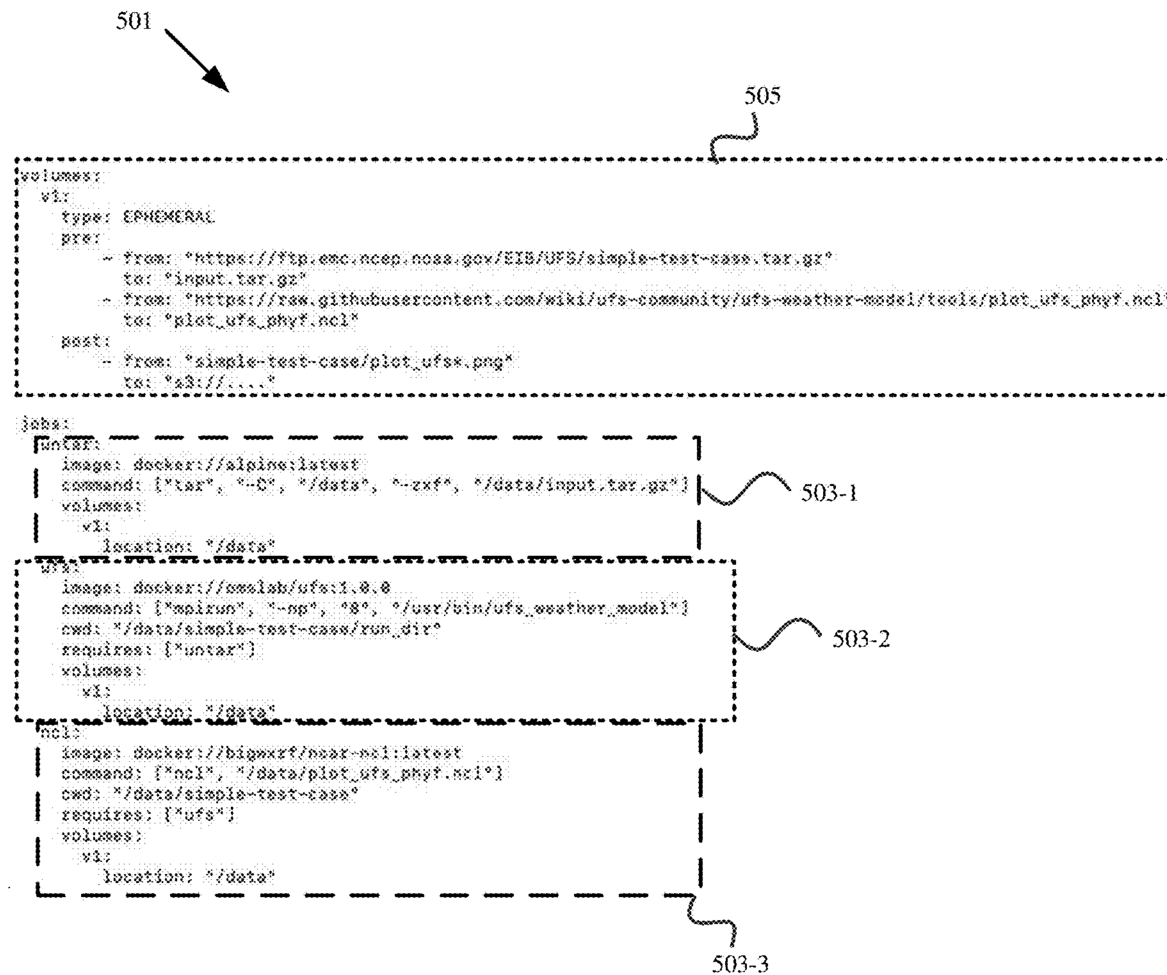
FIG. 5 illustrates an example of a task definition in accordance with some embodiments presented herein.

FIG. 5 illustrates an example of task definition 501 in accordance with some embodiments presented herein. As shown in FIG. 5, task definition 501 may identify three jobs 503-1, 503-2, and 503-3 (herein sometimes collectively referred to as "jobs 503" or individually as "job 503"), a sequential order of execution for jobs 503, and/or volume 505 for retrieving and/or storing the job data.

The definition for each job 503 may include a URL and/or identifier for retrieving the container that includes the executable code for that job 503. The definition for each job 503 may also include parameters for configuring that job 503, and/or commands for initiating execution of that job 503. The definition for each job 503 may also include a URL and/or identifier for the locations of the input, configuration, output, and/or other data for that job 503. In some embodiments, each job 503 definition may have metadata and/or tags to specify job dependencies, job requirements, and/or job policies. For instance, the tags may indicate that a first job may run in parallel with a second job because the jobs are independent of one another. Alternatively, the tags may indicate that a third job may not run until first and second jobs are complete as a result of third job requiring the output from the first and second jobs. The tags may also indicate policies for optimizing and/or prioritizing job execution. The policies may indicate that a job is optimized for execution on x86 processors (as opposed to ARM processors) and/or a GPU of a particular manufacturer. The policies may indicate maximum, minimum, and/or preferred resources to use in running a job. For instance, a policy may specify running a job on a maximum of 100 CPU cores, a minimum of 60 CPU cores, and a preferred 80 CPU cores. The policies may also specify general targets to maximize job performance, minimize job cost, minimize distance from input and/or output data storage, etc. These tags assist primary orchestrator 101 and/or orchestrator agents 103 in selecting compute nodes 105 that satisfy the policies and/or provide optimal performance.

With reference back to FIG. 4, process 400 may include parsing and/or analyzing the received (at 402) task definition in order to determine (at 404) the task and/or job state. Determining (at 404) the task and/or job state may include determining the location for the data accessed by each job, and/or the size, performance, cost, and/or other parameters associated with the data access. In some embodiments, the URL and/or identifier associated with the job data may map to a storage cluster at a particular network location. In some embodiments, primary orchestrator 101 may instruct various orchestrator agents 103 to request a small byte range of the job data and/or a head request, and may determine the storage location, size, performance, cost, and/or other parameters associated with the data access based on the responses to each byte range request or head request.

Process 400 may include obtaining (at 406) policies for executing the individual jobs and/or overall task. For instance, the policies may be defined as part of the job metadata. Alternatively, primary orchestrator 101 may obtain the name or identifier for a job or task from the task definition, and may retrieve policies that are defined for that job based on the job or task name or identifier. Accordingly, in some embodiments, the policies may be included as part of the task definition, or may be defined in a separate file, database, configuration, policy manager, and/or separate from the task definition.

As noted above, the policies may be generally defined to maximize performance, minimize cost, minimize data transfer, and/or other parameters. In some other embodiments, the policies may be specifically defined to set specific performance, cost, and/or other parameter targets. For instance, a performance policy may prioritize use of 8 core ARM processors, 16 gigabytes of memory, and compute nodes 105 in a particular geographic region. Policies with performance targets may be defined based on time (e.g., installation, configuration, and/or execution time), latency (e.g., time for exchange network messaging and/or data), specific resource allocations (e.g., execution time expected from different resources), distance, and/or other values. Policies with cost targets may be defined based on an amount of data to transfer, pricing for using different compute nodes 105 of different third-party service providers, price per unit of performance, and/or other values.

Process 400 may include determining (at 408) the current state of compute nodes 105 from the periodic state updates provided by orchestrator agents 103. The current state of compute nodes 105 may include identifying available resources of each available compute node 105, and/or the location of each available compute node 105.

Process 400 may include generating (at 410) one or more predictive models for execution of a next job in the task definition based on the determined (at 404) task state, obtained (at 406) policies, and/or determined (at 408) compute node 105 state. Generating (at 410) the predictive models may include modeling and/or scoring the probability or degree by which the available hardware resources of different compute nodes 105 may execute the next job within the specified targets or parameters of the obtained (at 406) policies given the current task state and the current compute node state. For instance, the predictive models may model and/or score performance, cost, and/or other parameters associated with different sets of compute nodes 105 accessing the next job data from its identified storage location, performing the next job operations using the hardware resources available at each set of compute nodes 105, and/or writing the next job output to a specified storage location. The predictive models may further account for the time and cost of allocating one or more compute nodes 105 to execute the next job, deploying the next job container to the one or more compute nodes 105, and/or configuring the container and compute node resources for execution.

In some embodiments, primary orchestrator 101 may generate (at 410) the predictive models based on performance, cost, and/or other benchmarks that are produced from a previous execution of the same job or a related job on the same or similar resources of compute nodes 105 being modeled or scored. In some embodiments, primary orchestrator 101 may generate (at 410) the predictive models based on a matching of the policies to the available resources at different compute nodes 105. For instance, the policies may prioritize execution of the next job on a particular processor architecture (e.g., x86, ARM, PowerPC, etc.), on a desired number of cores, with a desired amount of memory, and/or other specialized hardware resources. Primary orchestrator 101 may decide whether the hardware resources of compute nodes 105 match or exceed the desired allocation, are less than the desired allocation, and/or otherwise differ from the desired allocation. In some embodiments, primary orchestrator 101 may generate a score based on the availability of hardware resources of compute nodes 105 and the desired allocation. Primary orchestrator 101 may adjust the score based on the latency and/or distance between job data and compute nodes 105 executing the next job, and/or based on the amount of data to read and write.

Process 400 may include selecting (at 412) one or more compute nodes 105 for execution of the next job based on the predictive models. For instance, the predictive models may include individual scores that quantify the degree and/or probability by which each compute node 105 satisfies the performance, cost, distance, and/or other targets of each policy defined for the next job and/or task. The selected (at 412) one or more compute nodes 105 may include the compute nodes 105 with the highest cumulative score for the entire set of policies, wherein the highest cumulative score may identify the compute nodes 105 that optimize and/or prioritize execution of the next job according to the obtained policies better than other compute nodes 105. For instance, primary orchestrator 101 may select a first set of compute nodes 105 over a second set of compute nodes 105 when the first set of compute nodes 105 include x86 processors and have a maximum of 100 cores available in a first location, the second set of compute nodes 105 include ARM processors and have a maximum of 150 cores available in a second location, and the policies specify prioritizing x86 processors, 130 maximum cores, and resources in the first location. In this example, the first set of compute nodes 105 conform to the policies more closely than the second set of compute nodes 105, and may therefore be selected (at 412) for execution of the job.

Process 400 may include executing (at 414) the next job using the hardware resources of the selected (at 412) one or more compute nodes 105. In some embodiments, execution (at 414) of the next job may occur after execution of a prior job in the task definition or at the same time as the prior job depending on whether the operation and/or output of the prior job affects the operation and/or output of the next job. Executing (at 414) the next job may include identifying one or more orchestrator agents 103 that are associated with each of the selected (at 412) one or more compute nodes 105, and directing those orchestrator agents 103 in allocating, deploying, configuring, and/or instantiating the next job on the selected (at 412) one or more compute nodes 105.

By implementing process 400, the distributed HPC orchestration system may automatically distribute execution of a task across different sets of compute nodes 105 so that each and every job within the task definition is optimized and/or prioritized according to the specified set of policies. The distributed task execution may further involve establishing interoperability between the different sets of computes nodes so that the single task may be adapted to seamlessly execute on the same dataset at different compute sites and/or on different hardware resources that may be optimized for the different jobs without user specification of the different sets of computes nodes, different compute sites, and/or different hardware resources.

In other words, each job of a particular task cannot execute in isolation and/or independent of the jobs. Rather, each job may contribute to the overall task by processing the output and/or results created by another job of the same task and/or by producing output that may be accessed by another job of the same task. Accordingly, the distributed HPC orchestration system may establish compute node 105 interoperability to allow for different jobs of the same task to run on different compute nodes 105 while still having access to the same dataset that may be modified as each job executes.

Figure 6:
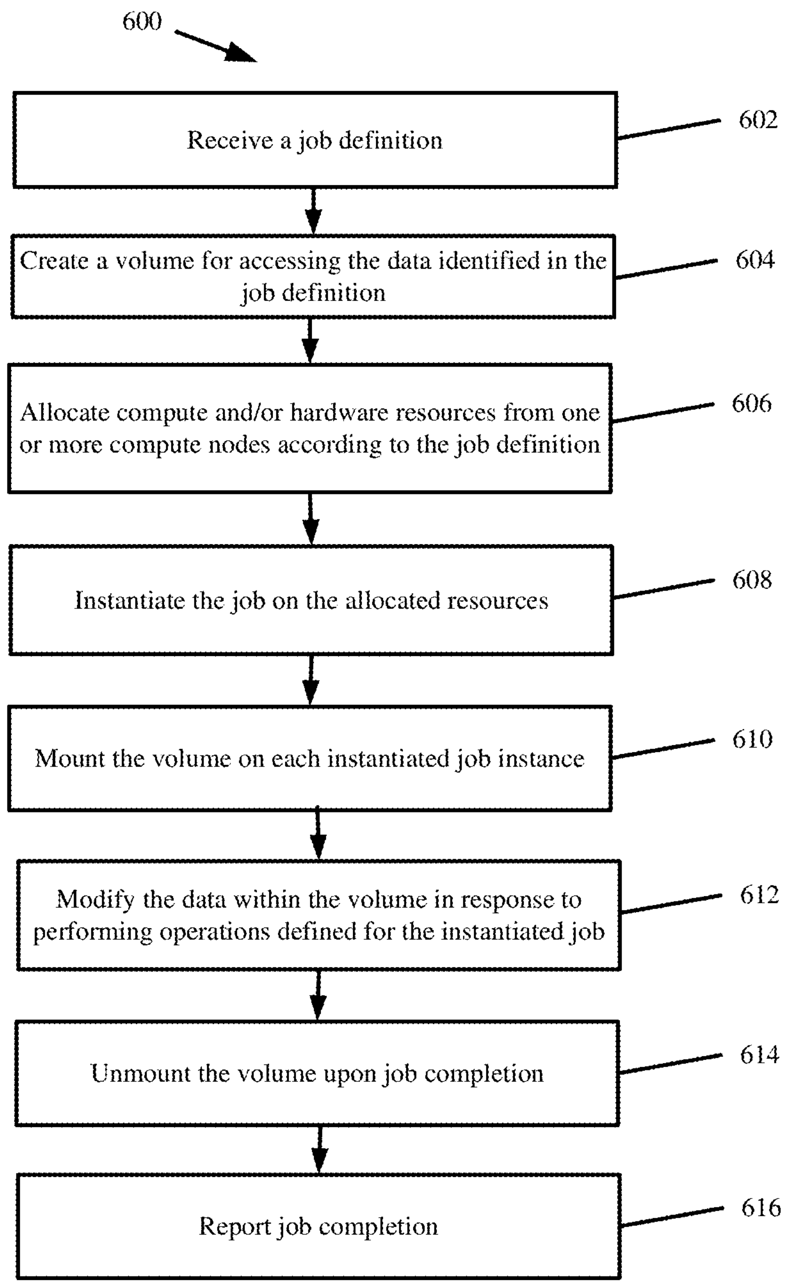
FIG. 6 presents a process for establishing compute node interoperability to allow for seamless distributed execution of different jobs of the same task across different compute nodes in accordance with some embodiments presented herein.

FIG. 6 presents a process 600 for establishing compute node 105 interoperability to allow for seamless distributed execution of different jobs of the same task across different compute nodes 105 in accordance with some embodiments presented herein. Process 600 may be implemented by the distributed HPC orchestration system. In particular, process 600 may be implemented by different orchestrator agents 103 that control the allocation, deployment, configuration, and/or instantiation of different jobs of the same task on different compute nodes 105.

Process 600 may include receiving (at 602) a job definition from primary orchestrator 101 at a particular orchestrator agent 103. The job definition may include one or more identifiers (e.g., URLs) for the one or more jobs to execute, one or more identifiers for the location of the data to be accessed by the one or more jobs, and a set of resources from selected compute nodes 105 to use in executing the one or more jobs.

Process 600 may include creating (at 604) a volume for accessing the data within the job definition. In some embodiments, creation (at 604) of the volume may be based on the one or more identifiers that identify the storage locations for the job data. The data identifiers may link to the entire dataset for the task at issue even though different jobs of the task may process and/or access different subsets of the dataset. The data may be stored across multiple storage devices in different storage clusters. Accordingly, creating (at 604) the volume may include creating a logical file system, directory, or path from which different compute nodes 105 may access the data despite the data being distributed across different storage devices.

Process 600 may include allocating (at 606) compute and/or hardware resources, that are specified in the job definition, from the selected compute nodes 105 for execution of the requested job. Orchestrator agent 103 may reserve different processor, memory, network, and/or other resources from the one or more selected compute nodes for the job execution.

Process 600 may include instantiating (at 608) the job on the allocated (at 606) resources. Instantiating (at 608) the job may include retrieving the container, executable environment, and/or executable image for the job from a repository identified by the one or more job identifiers, and installing, configuring, and/or running the job on the allocated resources.

Process 600 may include mounting (at 610) the volume so that the volume, and the job data contained therein, becomes accessible to each instantiated job instance. In some embodiments, the volume is mounted to a file system of the instantiated job or the one or more compute nodes 105 on which the instantiated job runs. Once the volume is mounted, each instantiated job instance may access the data using logical paths of the volume that may be subsequently mapped to identifiers for remotely accessing the data from different storage devices in different storage clusters. In some embodiments, mounting (at 610) the volume may include locking access to the data for the instantiated job instance. In some such embodiments, one running job instance may have exclusive access to the data. In some other embodiments, the volume may be mounted on different running job instances, and individual files may be locked for exclusive access by the different job instances.

Process 600 may include modifying (at 612) the data within the volume in response to performing operations defined for the instantiated job. In particular, the job may receive the data as input, may process the data, and/or may write output back into the volume. The job output may be written as new data that is stored in existing or new directories or paths created in the volume. Alternatively, the job output may include directly changing existing data within the volume.

Process 600 may include unmounting (at 614) the volume upon completing execution of the job. In some embodiments, unmounting (at 614) makes the volume and the data contained therein accessible to another job of the same task.

Accordingly, process 600 may include reporting (at 616) completion of the job to a higher level orchestrator agent 103 and/or primary orchestrator 101. If the task contains additional jobs that have yet to execute, primary orchestrator 101 may select compute nodes 105 to execute those jobs, and/or may instruct an associated orchestrator agent 103 to instantiate those jobs on the resources of the selected compute nodes 105. Each instantiated job may mount the volume in order to seamlessly access the data that is created and/or processed by earlier executing jobs of the same task. By creating a shareable volume that may be accessed by different compute nodes 105, the distributed HPC orchestration system is able to optimize the task execution by seamlessly distributing different jobs of the task for execution on different compute nodes 105 that are optimized for each job while providing the compute nodes 105 seamless access to a common dataset of the task.

Figure 7:
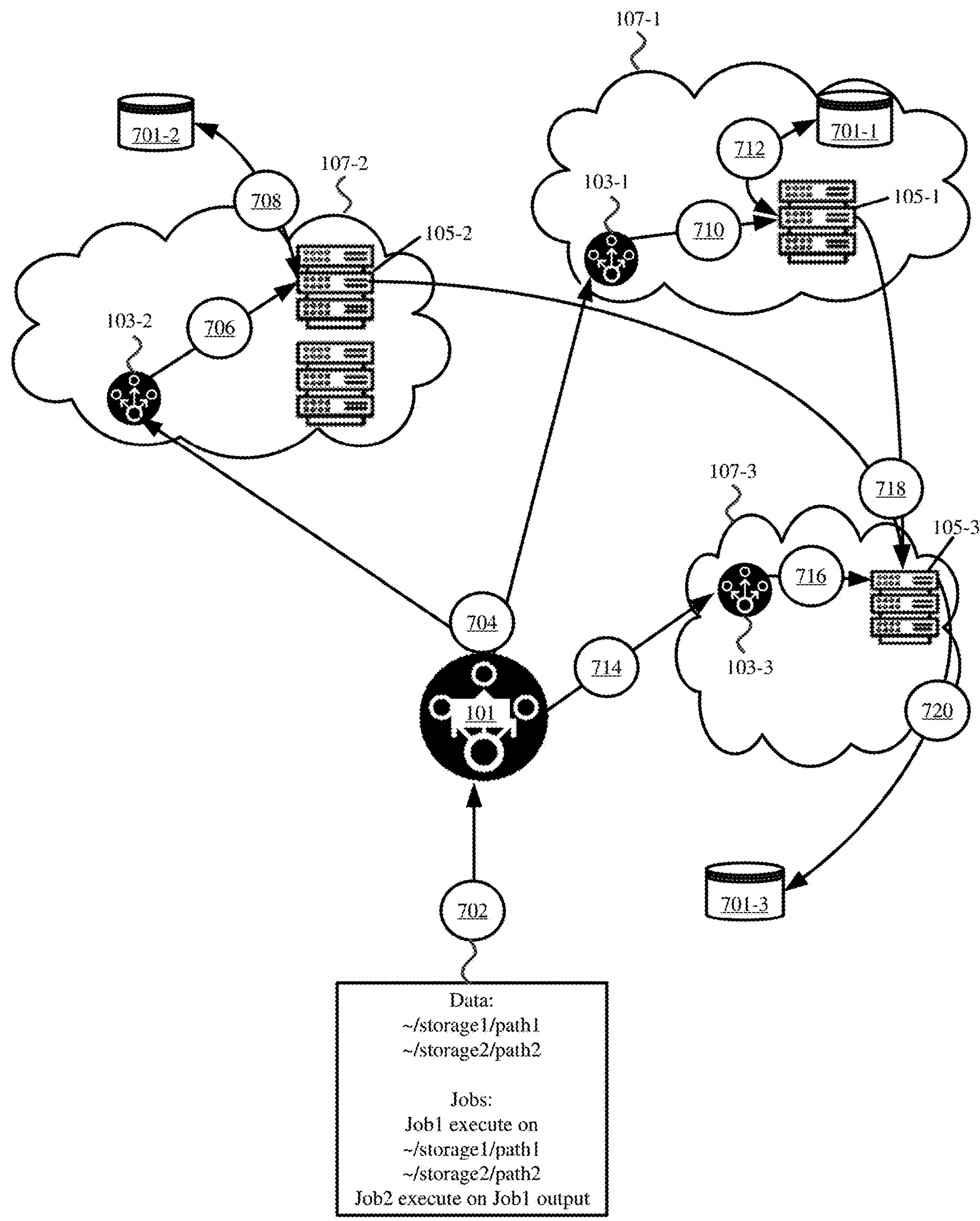
FIG. 7 illustrates an example of the distributed HPC orchestration system dynamically adapting task execution according to the complexity of the task in accordance with some embodiments presented herein.

In some embodiments, the distributed HPC orchestration system may dynamically scale and/or adapt task execution based on task complexity. FIG. 7 illustrates an example of the distributed HPC orchestration system dynamically adapting task execution according to the complexity of the task in accordance with some embodiments presented herein.

As shown in FIG. 7, primary orchestrator 101 may receive (at 702) a task definition that defines a set of jobs and the data required for executing the jobs. Primary orchestrator 101 may determine that the data is distributed and stored in different storage clusters 701-1 and 701-2. In some embodiments, primary orchestrator 101 may determine the different data storage locations from the one or more URLs provided in the task definition for accessing the data.

Primary orchestrator 101 may obtain policies that prioritize maximizing execution performance and/or minimizing execution cost. In order to satisfy the policies, primary orchestrator 101 may perform a distributed execution of the first job in the task definition. For instance, rather than instantiate a single instance of the first job on a single set of compute nodes 105 and pull the data from storage clusters 701-1 and 701-2 to the single set of compute nodes 105, primary orchestrator 101 may identify orchestrator agents 103-1 and 103-2 for different sets of compute nodes 105-1 and 105-2 that are located at or near each of storage clusters 701-1 and 701-2. Primary orchestrator 101 may direct (at 704) each orchestrator agent 103-1 and 103-2 in instantiating a different instance of the first job to run in parallel on each of the different sets of compute nodes 105-1 and 105-2.

Orchestrator agent 103-1 may configure (at 706) the first job instance running on compute nodes 105-1 to access and/or process (at 708) the data within nearest storage cluster 701-1. Similarly, orchestrator agent 103-2 may configure (at 710) the first job instance running on compute nodes 105-2 to access and/or process (at 712) the data within nearest storage cluster 701-2.

Primary orchestrator 101 may further determine that the most efficient execution of the second job may involve consolidating the output from the distributed execution of the first job at compute node 105-3, and processing the consolidated first job output at compute node 105-3. Accordingly, primary orchestrator 101 may direct (at 714) orchestrator agent 103-3 in instantiating (at 716) the second job on compute node 105-3. Orchestrator agent 103-3 may configure the second job to retrieve (at 718) the outputs of the first job from compute nodes 103-1 and 103-2.

In this manner, the distributed HPC orchestration system may automatically partition the first job across multiple sets of compute nodes 105-1 and 105-2 so that data access for the first job and/or execution of the first job may be prioritized to satisfy the task policies, and may compile the results at compute node 105-3 for optimal execution of the second job.

Upon retrieving and/or consolidating the first job output at compute node 105-3, compute node 105-3 may execute the second job, and may generate (at 720) new output based on processing of the consolidated first job output. The second job output may represent the completed task output. The task output may be stored in third storage cluster 701-3 that is closest to a location of a requesting user.

In some embodiments, the distributed HPC orchestration system may include a feedback loop for evolving the dynamic and/or adaptive orchestration of jobs. For instance, orchestrator agents 103 may track execution performance, cost, and/or other parameters for different jobs on different resources of different compute nodes 105. Orchestrator agents 103 may provide the tracked parameters to primary orchestrator 101.

Primary orchestrator 101 may perform machine learning based on the tracked parameters, and may determine the most performant, lowest cost, and/or other characteristics of the resources or compute nodes 105 used to execute the same or similar jobs. Moreover, in some such embodiments, primary orchestrator 101 may automatically configure policies for different jobs or tasks based on the machine learning. For instance, distributed HPC orchestration system may allocate 4 x86 processor cores and 4 ARM processor cores to perform a particular job using compute nodes 105 at a particular compute site 107. Primary orchestrator 101 and/or orchestrator agents 103 may determine that the 4 ARM processor cores complete the operations of the particular job faster and/or at lower cost than the 4 x86 processor cores. Accordingly, primary orchestrator 101 may automatically configure a policy that prioritizes allocation of the particular job on ARM processor costs.

For a subsequent task definition that includes the particular job, primary orchestrator 101 may select compute nodes 105 with ARM processors, and may assign the particular job to a particular orchestrator agent 103 with instruction to allocate, deploy, and/or execute the particular job on the ARM processors of the selected compute nodes 105. In this manner, primary orchestrator 101 may automatically develop and define policies for different jobs and/or tasks without user involvement, and may continually improve the distributed task execution by revising the selection of compute nodes 105 for different jobs and/or tasks based on the policies.

In some embodiments, primary orchestrator 101 may automatically tune the policies based on individual user or customer preferences, performance of a particular class or type of jobs, performance of available hardware resources, and/or other criteria. In other words, primary orchestrator 101 may track performance of different jobs across different hardware resources, may detect commonality in different sets of jobs and/or hardware resources that experience or provide similar performance, and may tune the policies based on the tracked performance for each set of jobs and/or hardware resources. In some such embodiments, primary orchestrator 101 may execute a utility theory process to select the optimal set of compute nodes 105 with which to complete a task.

Figure 8:
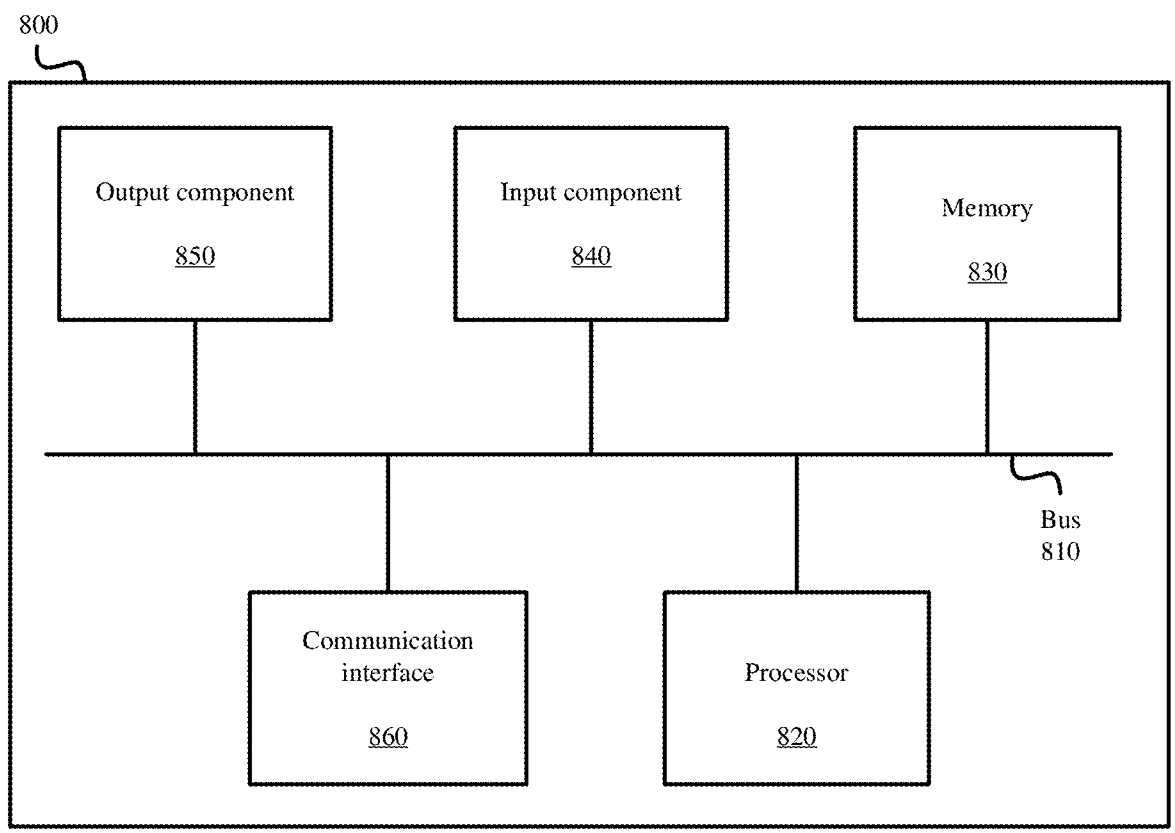
FIG. 8 illustrates example components of one or more devices, according to one or more embodiments described herein.

FIG. 8 is a diagram of example components of device 800. Device 800 may be used to implement one or more of the devices or systems described above (e.g., primary orchestrator 101, orchestrator agent 103, compute node 105, etc.). Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:

receiving a task comprising a plurality of jobs that operate on a particular dataset;

determining a set of policies that define execution priorities for the plurality of jobs;

determining a current state of a plurality of compute nodes that are distributed across different compute sites;

distributing the plurality of jobs across a first set of the plurality of compute nodes that are distributed across a first set of the compute sites in response to the current state of the first set of compute nodes satisfying more of the execution priorities from the set of policies than the current state of other compute nodes from the plurality of compute nodes; and producing task output based on modifications made to the particular dataset as each compute node of the first set of compute nodes executes a different job of the plurality of jobs.

2. The method of claim 1 further comprising:

determining a current state of the task; and selecting a first compute node of the first set of compute nodes to perform a particular job of the plurality of jobs based on proximity of the first compute node to a location of the current state of the task, wherein the location of the current state of the task accounts for one or more of a storage location of the particular dataset and a location of output produced from executing another job that is specified before the particular job in the task.

3. The method of claim 1, further comprising:

selecting a first compute node of the first set of compute nodes to perform a first job of the plurality of jobs in response to the current state of the first compute node including a first set of hardware resources that match optimized hardware resources identified for the first job in the set of policies; and selecting a second compute node of the first set of compute nodes to perform a different second job of the plurality of jobs in response to the current state of the second compute node including a second set of hardware resources that match optimized hardware resources identified for the second job in the set of policies, wherein the second set of hardware resources is different than the first set of hardware resources.

4. The method of claim 3, wherein the first set of hardware resources and the optimized hardware resources identified for the first job include a first processor architecture and a first number of processor cores, and wherein the second set of hardware resources and the optimized hardware resources identified for the second job include a different second processor architecture and a different second number of processor cores.

5. The method of claim 1 further comprising:

determining that the current state of the first set of compute nodes satisfies more of the execution priorities from the set of policies than the current state of other compute nodes from the plurality of compute nodes based on closer proximity of the first set of compute nodes to the particular dataset than the other compute nodes.

6. The method of claim 1 further comprising:

determining that the current state of the first set of compute nodes satisfies more of the execution priorities from the set of policies than the current state of other compute nodes from the plurality of compute nodes based on expected performance of using the first set of compute nodes to perform the plurality of jobs being faster than expected performance of using the other compute nodes to perform the plurality of jobs.

7. The method of claim 1 further comprising:

generating predictive models that simulate execution of each job of the plurality of jobs on the plurality of compute nodes based on a measure of similarity between the current state of the first set of compute nodes and the set of policies and a distance between each compute node and a location of data processed as part of each job.

8. The method of claim 7, wherein generating the predictive models comprises:

generating a score for one or more of performance and cost resulting from executing each job of the plurality of jobs on the plurality of compute nodes.

9. The method of claim 1, wherein distributing the plurality of jobs comprises:

determining a plurality of orchestrator agents at compute sites of the first set of compute nodes; and directing each orchestrator agent to instantiate a different job of the plurality of jobs on a different compute node of the first set of compute nodes.

10. The method of claim 9, wherein distributing the plurality of jobs further comprises:

allocating a set of hardware resources of a particular compute node of the first set of compute nodes with a particular orchestrator agent of the plurality of orchestrator agents that is located in a common compute site as the particular compute node; and deploying a container or image of a particular job on the set of hardware resources via operations performed by the particular orchestrator agent.

11. The method of claim 1 further comprising:

generating a volume with which to access the particular dataset;

modifying data of the particular dataset with a first compute node of the first set of compute nodes in response to mounting the volume on the first compute node during execution of a first job of the plurality of jobs by the first compute node;

unmounting the volume from the first compute node upon completion of the first job; and accessing data entered into the particular dataset by the first compute node at a second compute node of the first set of compute nodes in response to mounting the volume on the second compute node during execution of a second job of the plurality of jobs, that is after the first job, by the second compute node.

12. The method of claim 1, wherein distributing the plurality of jobs comprises:

executing a first job of the plurality of jobs with a first compute node of the first set of compute nodes accessing and modifying a first set of the particular dataset that is stored in a storage cluster nearest the first compute node; and executing the first job with a second compute node of the first set of compute nodes accessing and modifying a different second set of the particular dataset that is stored in a storage cluster nearest the second compute node, wherein the first compute node is at a different compute site than the second compute node, and wherein the first compute node executes in parallel with the second compute node to complete the first job.

13. The method of claim 12, wherein distributing the plurality of jobs further comprises:

executing a second job of the plurality of jobs with a third compute node of the first set of compute nodes based on output that is generated and aggregated from the first compute node and the second compute node.

14. A system comprising:

one or more processors configured to:

receive a task comprising a plurality of jobs that operate on a particular dataset;

determine a set of policies that define execution priorities for the plurality of jobs;

determine a current state of a plurality of compute nodes that are distributed across different compute sites;

distribute the plurality of jobs across a first set of the plurality of compute nodes that are distributed across a first set of the compute sites in response to the current state of the first set of compute nodes satisfying more of the execution priorities from the set of policies than the current state of other compute nodes from the plurality of compute nodes; and produce task output based on modifications made to the particular dataset as each compute node of the first set of compute nodes executes a different job of the plurality of jobs.

15. The system of claim 14, wherein the one or more processors are further configured to:

determine a current state of the task; and select a first compute node of the first set of compute nodes to perform a particular job of the plurality of jobs based on proximity of the first compute node to a location of the current state of the task, wherein the location of the current state of the task accounts for one or more of a storage location of the particular dataset and a location of output produced from executing another job that is specified before the particular job in the task.

16. The system of claim 14, wherein the one or more processors are further configured to:

select a first compute node of the first set of compute nodes to perform a first job of the plurality of jobs in response to the current state of the first compute node including a first set of hardware resources that match optimized hardware resources identified for the first job in the set of policies; and select a second compute node of the first set of compute nodes to perform a different second job of the plurality of jobs in response to the current state of the second compute node including a second set of hardware resources that match optimized hardware resources identified for the second job in the set of policies, wherein the second set of hardware resources is different than the first set of hardware resources.

17. The system of claim 14, wherein the one or more processors are further configured to:

determine that the current state of the first set of compute nodes satisfies more of the execution priorities from the set of policies than the current state of other compute nodes from the plurality of compute nodes based on closer proximity of the first set of compute nodes to the particular dataset than the other compute nodes.

18. The system of claim 14, wherein the one or more processors are further configured to:

determine that the current state of the first set of compute nodes satisfies more of the execution priorities from the set of policies than the current state of other compute nodes from the plurality of compute nodes based on expected performance of using the first set of compute nodes to perform the plurality of jobs being faster than expected performance of using the other compute nodes to perform the plurality of jobs.

19. The system of claim 14, wherein the one or more processors are further configured to:

generate predictive models that simulate execution of each job of the plurality of jobs on the plurality of compute nodes based on a measure of similarity between the current state of the first set of compute nodes and the set of policies and a distance between each compute node and a location of data processed as part of each job.

20. A non-transitory computer-readable medium, storing a plurality of processor-executable instructions to:

receive a task comprising a plurality of jobs that operate on a particular dataset;

determine a set of policies that define execution priorities for the plurality of jobs;

determine a current state of a plurality of compute nodes that are distributed across different compute sites;

distribute the plurality of jobs across a first set of the plurality of compute nodes that are distributed across a first set of the compute sites in response to the current state of the first set of compute nodes satisfying more of the execution priorities from the set of policies than the current state of other compute nodes from the plurality of compute nodes; and produce task output based on modifications made to the particular dataset as each compute node of the first set of compute nodes executes a different job of the plurality of jobs.

* * * * *